(12) United States Patent
Usui et al.

(10) Patent No.: US 11,161,971 B2
(45) Date of Patent: Nov. 2, 2021

(54) RESIN COMPOSITION, MELT-FORMING MATERIAL, MULTILAYER STRUCTURE, AND HOT-WATER STERILIZABLE PACKAGING MATERIAL

(71) Applicant: Mitsubishi Chemical Corporation, Tokyo (JP)

(72) Inventors: Shintaro Usui, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/829,480

(22) Filed: Mar. 25, 2020

(65) Prior Publication Data

US 2020/0224018 A1 Jul. 16, 2020

Related U.S. Application Data

(63) Continuation of application No. PCT/JP2018/043112, filed on Nov. 22, 2018.

(30) Foreign Application Priority Data

Nov. 22, 2017 (JP) .............................. JP2017-224607

(51) Int. Cl.
*C08L 29/04* (2006.01)
*B32B 27/30* (2006.01)
*B32B 27/34* (2006.01)
*B65D 65/40* (2006.01)

(52) U.S. Cl.
CPC ............ *C08L 29/04* (2013.01); *B32B 27/306* (2013.01); *B32B 27/34* (2013.01); *B65D 65/40* (2013.01); *B32B 2270/00* (2013.01); *B32B 2553/00* (2013.01)

(58) Field of Classification Search
CPC ..... C08L 29/04; B65D 65/40; B32B 2553/00; B32B 27/34; B32B 2770/00; B32B 27/306
USPC ........................................................ 524/315
See application file for complete search history.

(56) References Cited

U.S. PATENT DOCUMENTS

| | | | |
|---|---|---|---|
| 5,744,547 A | 4/1998 | Moritani et al. | |
| 2004/0204549 A1 | 10/2004 | Yoshimi et al. | |
| 2007/0148481 A1 | 6/2007 | Onishi | |
| 2007/0275197 A1* | 11/2007 | Chow | B32B 27/306 428/35.7 |
| 2012/0009431 A1 | 1/2012 | Kazeto | |
| 2013/0040087 A1 | 2/2013 | Kazeto et al. | |
| 2015/0159005 A1* | 6/2015 | Nakazawa | B32B 27/08 426/412 |
| 2016/0221314 A1* | 8/2016 | Kawai | C08L 23/0861 |
| 2016/0229987 A1 | 8/2016 | Kawai et al. | |
| 2017/0198066 A1* | 7/2017 | Matsui | B32B 27/10 |
| 2018/0319965 A1 | 11/2018 | Seno et al. | |
| 2019/0077945 A1 | 3/2019 | Hashimoto et al. | |

FOREIGN PATENT DOCUMENTS

| | | |
|---|---|---|
| EP | 3467027 A1 | 4/2019 |
| JP | H9-071620 | 3/1997 |
| JP | 2001-206999 | 7/2001 |
| JP | 2005-178324 | 7/2005 |
| JP | 2007-314788 | 12/2007 |
| JP | 2009-242591 | 10/2009 |
| JP | 2015-083496 | 4/2015 |
| WO | 2010/071241 | 6/2010 |
| WO | 2011/125736 | 10/2011 |
| WO | 2017-082063 | 5/2017 |
| WO | 2017-204272 | 11/2017 |

OTHER PUBLICATIONS

ISR issued in WIPO Patent Application No. PCT/JP2017/019451, Aug. 15, 2017, English translation.
IPRP issued in WIPO Patent Application No. PCT/JP2017/019451, Nov. 27, 2018, English translation.
ISR issued in WIPO Patent Application No. PCT/JP2018/043112, Nov. 22, 2018, English translation.
IPRP issued in WIPO Patent Application No. PCT/JP2018/043112, May 26, 2020, English translation.
SESR issued in EP Patent Application No. 18880274.8, Nov. 11, 2020.

* cited by examiner

*Primary Examiner* — Hui H Chin

(74) *Attorney, Agent, or Firm* — Greenblum & Bernstein, P.L.C.

(57) ABSTRACT

A resin composition contains: (A) an ethylene-vinyl alcohol copolymer; (B) a polyamide resin; and (C) a sorbic acid ester; wherein the sorbic acid ester (C) is present in an amount of 0.00001 to 10 ppm based on the weight of the resin composition. The resin composition is less susceptible to coloration and melt viscosity increase.

5 Claims, No Drawings

RESIN COMPOSITION, MELT-FORMING MATERIAL, MULTILAYER STRUCTURE, AND HOT-WATER STERILIZABLE PACKAGING MATERIAL

RELATED APPLICATION

This application is a continuation of International Application No. PCT/JP2018/043112, filed on Nov. 22, 2018, which claims priority to Japanese Patent Application No. 2017-224607, filed on Nov. 22, 2017, the entire contents of each of which being hereby incorporated by reference.

TECHNICAL FIELD

The present disclosure relates to a resin composition containing an ethylene-vinyl alcohol copolymer (hereinafter abbreviated as "EVOH"), a melt-forming material produced by using the resin composition, a multilayer structure, and a hot-water sterilizable packaging material. More specifically, the present disclosure relates to a resin composition less susceptible to coloration, a melt-forming material formed from the resin composition, a multilayer structure including a layer formed from the resin composition, and a hot-water sterilizable packaging material.

BACKGROUND ART

EVOH is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials. When a packaging material including an EVOH layer formed from the EVOH is subjected to a hot-water sterilization process such as retort process or boiling process, however, the EVOH layer is liable to dissolve out of the packaging material into water, or to have a poorer gas barrier property. A known art for coping with this is to use a polyamide resin in combination with the EVOH (see, for example, PTL 1 and PTL 2).

RELATED ART DOCUMENTS

Patent Documents

PTL 1: JP-A-2005-178324
PTL 2: JP-A-2009-242591

SUMMARY

Resin compositions each containing the EVOH and the polyamide resin as disclosed in PTL 1 and PTL 2 are liable to be colored due to heating during melt kneading or melt forming, and tend to suffer from increase in melt viscosity and, hence, deterioration in long-run formability. Therefore, improvement is required.

The inventors conducted intensive studies in view of the foregoing and, as a result, found that, where the resin composition containing the EVOH and the polyamide resin further contains a specific very small amount of a sorbic acid ester, the above problem can be solved.

According to a first aspect of the present disclosure, there is provided a resin composition containing: (A) an EVOH; (B) a polyamide resin; and (C) a sorbic acid ester; wherein the sorbic acid ester (C) is present in an amount of 0.00001 to 10 ppm based on the weight of the resin composition. According to a second aspect of the present disclosure, a melt-forming material formed from the resin composition is provided. According to a third aspect of the present disclosure, a multilayer structure including a layer formed from the resin composition is provided. According to a fourth aspect of the present disclosure, a hot-water sterilizable packaging material formed from the multilayer structure is provided.

The resin composition of the present disclosure contains the EVOH (A), the polyamide resin (B), and the sorbic acid ester (C). In the resin composition, the sorbic acid ester (C) is present in an amount of 0.00001 to 10 ppm based on the weight of the resin composition. Thus, the resin composition containing the EVOH (A) and the polyamide resin (B) is highly effective for suppressing the coloration and the melt viscosity increase due to the heating in the melt kneading and the melt forming.

Where the weight ratio of the EVOH (A) to the polyamide resin (B) is (A)/(B)=1/99 to 99/1, the coloration-suppressing effect and the melt viscosity increase-suppressing effect are excellent.

The melt-forming material formed from the resin composition of the present disclosure is less susceptible to the coloration and the melt viscosity increase and, therefore, is formed into various products, which can be advantageously used as packaging materials, for example, for foods, chemical agents, agricultural chemicals, and the like, particularly used as hot-water sterilizable packaging materials.

The multilayer structure including the layer formed from the resin composition of the present disclosure is less susceptible to the coloration and the melt viscosity increase and, therefore, is formed into various products, which can be advantageously used as packaging materials, for example, for foods, chemical agents, agricultural chemicals, and the like, particularly used as hot-water sterilizable packaging materials.

DESCRIPTION OF EMBODIMENTS

Preferred embodiments of the present disclosure will hereinafter be described in detail. It should be understood that these preferred embodiments are illustrative but not limitative.

<Resin Composition>

The resin composition of the present disclosure contains: (A) an EVOH; (B) a polyamide resin; and (C) a sorbic acid ester. The components of the resin composition of the present disclosure will hereinafter be described in turn.

[EVOH (A)]

The EVOH (A) to be used in the present disclosure is a water-insoluble thermoplastic resin, which is typically prepared by copolymerizing ethylene and a vinyl ester monomer and then saponifying the resulting copolymer, and is generally referred to as ethylene-vinyl alcohol copolymer or saponified ethylene-vinyl ester copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and generally further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters are typically each used alone or, as required, a plurality of vinyl esters may be selected from these vinyl esters to be used in combination.

The ethylene structural unit content of the EVOH (A), which is measured in conformity with ISO14663, is typically 20 to 60 mol %, preferably 25 to 50 mol %, particularly preferably 25 to 45 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The vinyl ester saponification degree of the EVOH (A), which is measured in conformity with JIS K6726 (with the use of a solution obtained by homogenously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may further contain a structural unit derived from any of the following comonomers in an amount that does not impair the effects of the present disclosure (e.g., typically in an amount of not greater than 20 mol %, preferably not greater than 10 mol %, of the EVOH (A)).

The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products (acylation products) of these hydroxyl-containing α-olefins such as 3,4-diacyloxy-1-butene, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxymethyl vinylidenes such as 1,3-hydroxy-2-methylenepropane and 1,5-hydroxy-3-methylenepentane, and esterification products of these hydroxymethyl vinylidenes (i.e., vinylidene diacetates) such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acylamidopropane sulfonic acid and its salts, and acrylamidopropyldimethylamine and its acid salts and quaternary salts; methacrylamide compounds such as methacrylamide, N-alkylmethacrylamide each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1 to C18 alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH containing a structural unit having a primary hydroxyl group in its side chain among structural units derived from the aforementioned comonomers is preferred because the secondary formability is improved in stretching process, vacuum pressure forming process, and the like. Particularly, an EVOH containing a structural unit having 1,2-diol in its side chain is preferred.

Where the EVOH (A) contains the structural unit having the primary hydroxyl group in its side chain, the primary hydroxyl group content is typically 0.1 to 20 mol %, preferably 0.1 to 15 mol %, particularly preferably 1 to 10 mol %.

The EVOH (A) may be a mixture of different EVOHs. These EVOHs may have different contents of the ethylene structural unit, different contents of the structural unit having the primary hydroxyl group in the side chain, different saponification degrees, and different melt flow rates (MFRs), and contain different comonomer components.

In the present disclosure, post-modified EVOHs such as urethanized EVOH, acetalized EVOH, cyanoethylated EVOH, and oxyalkylenated EVOH are also usable as the EVOH (A).

In the resin composition of the present disclosure, the EVOH (A) is typically present in a proportion of not less than 1 wt. %, preferably not less than 10 wt. %, more preferably not less than 50 wt. %, still more preferably not less than 60 wt. %, further preferably not less than 70 wt. %, particularly preferably not less than 85 wt. %. The upper limit of the proportion of the EVOH (A) is typically 99 wt. %. Where the proportion of the EVOH (A) falls within the aforementioned range, the effects of the present disclosure tend to be efficiently provided.

[Polyamide Resin (B)]

The polyamide resin (B) to be used in the present disclosure is a known water-insoluble thermoplastic resin.

Examples of the polyamide resin (B) include: homopolymers such as polycapramide (nylon 6), poly-ω-aminoheptanoic acid (nylon 7), poly-ω-aminononanoic acid (nylon 9), polyundecanamide (nylon 11), and polylauryllactam (nylon 12); polyamide copolymer resins including aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylenediamine adipamide/hexamethylenediammonium adipate copolymers (nylon 26/66), caprolactam/hexamethylenediammonium adipate/hexamethylenediammonium sebacate copolymers (nylon 66/610), and ethyleneammonium adipate/hexamethylenediammonium adipate/hexamethylenediammonium sebacate copolymers (nylon 6/66/610), and aromatic polyamides such as polyhexamethylene isophthalamide, polyhexamethylene terephthalamide, poly-m-xylylene adipamide, hexamethylene isophthalamide/terephthalamide copolymers, poly-p-phenylene terephthalamide, and poly-p-phenylene/3,4'-diphenyl ether terephthalamide; and amorphous polyamides, polyamide resins obtained by modifying any of these polyamide resins with an aromatic amine such as methylenebenzylamine or m-xylenediamine, m-xylylenediammonium adipate, and polyamide resins obtained by terminal-modifying any of these polyamide resins. Particularly, the terminal-modified polyamide resins are preferred. These polyamide resins may be used alone or in combination as the polyamide resin (B).

The polyamide resin (B) tends to have a higher bonding force to a resin having a polar group (e.g., the EVOH (A)). Therefore, the resin composition containing the EVOH (A) and the polyamide resin (B) is advantageously used for improvement of the moisture resistance of a multilayer structure including a layer of the resin composition and a layer of some other thermoplastic resin laminated together.

The molecular weight percentage of an amide bond in an amide monomer unit of the polyamide resin (B) (in the case of nylon 6, for example, the molecular weight percentage of the amide bond (—CONH—) in an amide monomer unit (—$C_6H_5$—CONH—)) is preferably 20 to 60%, more preferably 30 to 50%, particularly preferably 35 to 45%. If the amide bond percentage is excessively low, the polyamide resin (B) tends to have a reduced bonding force in an interface with respect to the polar resin (EVOH (A)). If the amide bond percentage is excessively high, on the other hand, the polyamide resin (B) tends to have an excessively high reactivity with respect to the polar resin (EVOH (A)) in the melt forming. Therefore, poor appearance is liable to occur due to a rough bonding interface in coextrusion.

The polyamide resin (B) preferably has a melting point of 160° C. to 270° C., more preferably 175° C. to 250° C., particularly preferably 190° C. to 230° C. If the melting point of the polyamide resin (B) is excessively low, a multilayer structure produced by using the resin composition tends to be poorer in heat resistance. If the melting point of the polyamide resin (B) is excessively high, on the other hand, the resin composition tends to have a greater difference in melting point with respect to a resin to be used as a material for the other resin layer of the multilayer structure. Therefore, when the resin composition and the other resin are coextruded to be merged, layer turbulence is liable to occur, resulting in poorer appearance of the multilayer structure. Further, the coextrusion of the resin composition and the other resin requires a higher die temperature and, therefore, the coloration is liable to be aggravated due to the thermal degradation of the EVOH (A).

In view of this, the polyamide resin (B) preferably has a melting point of 160° C. to 270° C., more preferably 175° C. to 250° C., particularly preferably 190° C. to 230° C., and an amide bond percentage of 20 to 60%, more preferably 30 to 50%, particularly preferably 35 to 45%. Specific preferred examples of the polyamide resin (B) include nylon 6 (having a melting point of about 225° C. and an amide bond percentage of 38%), and nylon 6/66 (having a melting point of about 195° C. and an amide bond percentage of 38%).

The relative viscosity of the polyamide resin (B), which is an index of the polymerization degree, is typically 1.5 to 6, more preferably 2.0 to 6, still more preferably 2.5 to 5. If the relative viscosity is excessively low, it tends to be difficult to extrude the resin composition because a higher torque occurs in an extruder during the forming. If the relative viscosity is excessively high, a film or a sheet formed from the resin composition tends to have a poorer thickness accuracy. The relative viscosity is determined in conformity with JIS K6933 by completely dissolving 1 g of the polyamide resin in 100 mL of 96% concentrated sulfuric acid, and measuring the viscosity of the resulting solution at 25° C. by means of a capillary viscometer.

In the resin composition of the present disclosure, the weight ratio (A)/(B) of the EVOH (A) to the polyamide resin (B) is typically 1/99 to 99/1, preferably 10/90 to 99/1, more preferably 50/50 to 98/2, still more preferably 60/40 to 95/5, particularly preferably 70/30 to 95/5, especially preferably 75/25 to 95/5. If the weight ratio of the polyamide resin (B) is excessively low, the effect of blending the polyamide resin (B) (e.g., the hot-water sterilization resistance of the formed product) tends to be reduced. If the weight ratio of the polyamide resin (B) is excessively high, the gas barrier property tends to be deteriorated.

In the resin composition of the present disclosure, the total amount of the EVOH (A) and the polyamide resin (B) is typically not less than 70 wt. %, preferably not less than 80 wt. %, more preferably not less than 90 wt. %. The upper limit of the total amount of the EVOH (A) and the polyamide resin (B) corresponds to a weight obtained by subtracting the weight of the sorbic acid ester (C) from the weight of the resin composition.

[Sorbic Acid Ester (C)]

In the present disclosure, the resin composition containing the EVOH (A) and the polyamide resin (B) further contains the sorbic acid ester (C) in a specific very small amount, thereby providing remarkable effects for suppressing the coloration and the melt viscosity increase.

As described above, the resin composition containing the EVOH and the polyamide resin is generally susceptible to the coloration and the melt viscosity increase during the melt kneading and the melt forming. This is supposedly because the EVOH and the polyamide resin react with each other in interfaces therebetween in a melt mixture of the EVOH and the polyamide resin and, at this time, the EVOH is dehydrated to cause the coloration of the resin composition, and because a polymer having a higher polymerization degree is generated by the reaction between the EVOH and the polyamide resin to increase the melt viscosity.

In the present disclosure, a reason why the coloration and the melt viscosity increase of the resin composition are suppressed by the blending of the specific very small amount of the sorbic acid ester (C) may be that the sorbic acid ester (C) has a lower polarity and, therefore, can be homogeneously dispersed in the EVOH (A) even if being present in the very small amount in the resin composition. It is considered that the sorbic acid ester (C) is hydrolyzed to generate sorbic acid, which in turn captures radicals, whereby the excellent coloration-suppressing effect is provided. Further, it is supposed that a so-called catalytic cycle occurs in which an alcohol resulting from the hydrolysis of the sorbic acid ester (C) reacts with sorbic acid capturing the radicals, whereby the sorbic acid ester (C) is generated, and then the sorbic acid ester (C) thus generated is thermally hydrolyzed again.

It is supposed that sorbic acid capable of capturing radicals is constantly generated and, therefore, the radicals can be captured in the resin composition at the early stage of the radical generation, making it possible to provide the excellent coloration-suppressing effect. It is also supposed that, in the present disclosure in which the resin composition contains the sorbic acid ester (C) in the specific very small amount, the aforementioned cycle can efficiently work to thereby provide the remarkable thermal degradation preventing effect and coloration-suppressing effect.

It is generally said that, where a reaction product of the EVOH and the polyamide resin is present in the resin composition, a layer of the resin composition is effectively prevented from dissolving out into water during a hot-water sterilization process. It is supposed that, in the resin composition of the present disclosure, the sorbic acid ester (C) moderately prevents the reaction between the EVOH (A) and the polyamide resin (B), whereby the melt viscosity increase is suppressed to such an extent as not to impair the long-run formability.

A sorbic acid ester prepared by condensation of sorbic acid and an alcohol or a phenol derivative, for example, is usable as the sorbic acid ester (C). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of the alcohol resulting from the hydrolysis of the sorbic acid ester (C) is relatively low, the resin composition is less susceptible to the coloration. Therefore, the alkyl sorbates are preferred, and alkyl sorbates containing a C1 to C5 alkoxy group are more preferred. Alkyl sorbates containing a C1 to C3 alkoxy group are particularly preferred, and methyl sorbate and ethyl sorbate are most preferred.

The sorbic acid ester (C) typically has a molecular weight of 120 to 220, preferably 120 to 200, particularly preferably 120 to 160. Where the molecular weight of the sorbic acid ester (C) falls within the aforementioned range, the coloration-suppressing effect tends to be efficiently provided.

The amount of the sorbic acid ester (C) contained in the resin composition is 0.00001 to 10 ppm, preferably 0.00005 to 5 ppm, more preferably 0.0001 to 4 ppm, particularly preferably 0.0005 to 3 ppm, especially preferably 0.001 to 1 ppm, based on the weight of the resin composition. Where the amount of the sorbic acid ester (C) falls within the aforementioned range, the coloration-suppressing effect and the melt viscosity increase-suppressing effect are efficiently provided. If the amount of the sorbic acid ester (C) is excessively great, the number of conjugated double bonds is excessively great, so that the coloration is liable to result. Further, the reaction between the EVOH (A) and the polyamide resin (B) is liable to be excessively suppressed.

The amount of the sorbic acid ester (C) contained in the resin composition is typically 0.0001 to 10 ppm, preferably 0.0005 to 5 ppm, more preferably 0.0008 to 3 ppm, particularly preferably 0.001 to 1.5 ppm, based on the total weight of the EVOH (A) and the sorbic acid ester (C). Where the amount of the sorbic acid ester (C) falls within the aforementioned range, the effects of the present disclosure tend to be efficiently provided. If the amount of the sorbic acid ester (C) is excessively great, the number of conjugated double bonds is excessively great, so that the coloration is liable to result. Further, the reaction between the EVOH (A) and the polyamide resin (B) is liable to be excessively suppressed.

In the case of pellets and other products formed from the resin composition of the present disclosure, the amount of the sorbic acid ester (C) contained in the resin composition can be measured by the following method. A sample is first prepared by pulverizing the formed product (e.g., the pellets) by a given method (e.g., a freeze-pulverizing method), and dissolving the pulverized product in a C1 to C5 lower alcohol solvent. Then, the sample is analyzed by a liquid chromatography/mass spectrometry (LC/MS/MS) method, whereby the amount of the sorbic acid ester (C) is determined.

In the case of a formed product containing the resin composition and some other thermoplastic resin or the like (e.g., a multilayer structure), a layer of the resin composition to be analyzed is taken out of the multilayer structure by a given method, and the measurement is performed in the aforementioned manner.

[Other Thermoplastic Resin]

The resin composition of the present disclosure may further contain a thermoplastic resin other than the EVOH (A) and the polyamide resin (B) as a resin component typically in an amount of not greater than 30 wt. %, preferably not greater than 10 wt. %, based on the weight of the resin composition.

Specific examples of the other thermoplastic resin include olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes, and polypentenes, polycycloolefins, polyolefin resins in a broader sense such as modified polyolefin resins obtained by graft-modifying any of the aforementioned olefin homopolymers and copolymers with an unsaturated carboxylic acid or an unsaturated carboxylic acid ester, polystyrene resins, polyester resins, chlorinated vinyl resins such as polyvinyl chlorides and polyvinylidene chlorides, acrylic resins, vinyl ester resins, polystyrene elastomers, polyester elastomers, polyurethane elastomers, chlorinated polyethylenes, and chlorinated polypropylenes. These thermoplastic resins may be used alone or in combination.

[Other Additives]

As required, the resin composition of the present disclosure may contain known additives in addition to the aforementioned components in amounts that do not impair the effects of the present disclosure (e.g., in amounts of not greater than 10 wt. %, preferably not greater than 5 wt. %, based on the overall weight of the resin composition). Examples of the additives include: plasticizer (e.g., aliphatic polyhydric alcohol such as ethylene glycol, glycerin, hexanediol, or the like); lubricant such as higher fatty acid (e.g., lauric acid, myristic acid, palmitic acid, stearic acid, behenic acid, oleic acid, or the like), higher fatty acid metal salt (e.g., calcium stearate, magnesium stearate, or the like), higher fatty acid ester (e.g., methyl ester, isopropyl ester, butyl ester, octyl ester, or the like of higher fatty acid), higher fatty acid amide (e.g., stearamide, oleamide, or the like), bis-higher fatty acid amide (e.g., ethylene bis-stearamide, or the like), or low-molecular weight polyolefin (e.g., low-molecular weight polyethylene or low-molecular weight polypropylene having a molecular weight of about 500 to about 10,000); drying agent; oxygen absorber; inorganic filler; heat stabilizer; photo stabilizer; flame retardant;

crosslinking agent; curing agent; foaming agent; crystal nucleating agent; antifogging agent; biodegradation agent; silane coupling agent; antiblocking agent; antioxidant; colorant; antistatic agent; UV absorber; antibacterial agent; insoluble inorganic double salt (e.g., hydrotalcites or the like); surfactant; and wax. These may be used alone or in combination.

Examples of the heat stabilizer to be used for improving the heat stability and other various physical properties during the melt forming include: organic acids such as acetic acid, propionic acid, and butyric acid, salts of the organic acids such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and salts of the inorganic acids such as alkali metal salts (sodium salts, potassium salts, and the like), alkali earth metal salts (calcium salts, magnesium salts, and the like), and zinc salts of the inorganic acids.

Of these, acetic acid, boron compounds such as boric acid and its salts, acetic acid salts, and phosphoric acid salts are preferably blended as the heat stabilizer.

The amount of acetic acid to be blended as the heat stabilizer is typically 0.001 to 1 part by weight, preferably 0.005 to 0.2 parts by weight, particularly preferably 0.01 to 0.1 part by weight, based on 100 parts by weight of the EVOH (A). If the amount of acetic acid is excessively small, the effect of blending acetic acid tends to be reduced. If the amount of acetic acid is excessively great, on the other hand, formation of a uniform film tends to be difficult.

The amount of a boron compound to be blended as the heat stabilizer is typically 0.001 to 1 part by weight on a boron basis based on 100 parts by weight of the EVOH (A) (as measured by ICP emission spectrometry after ashing). If the amount of the boron compound is excessively small, the effect of blending the boron compound tends to be reduced. If the amount of the boron compound is excessively great, on the other hand, formation of a uniform film tends to be difficult.

The amount of an acetic acid salt or a phosphoric acid salt (or a hydrogen phosphoric acid salt) to be blended as the heat stabilizer is typically 0.0005 to 0.1 part by weight on a metal basis based on 100 parts by weight of the EVOH (A) (as measured by ICP emission spectrometry after ashing). If the amount of the acetic acid salt or the phosphoric acid salt is excessively small, the effect of the blending tends to be reduced. If the amount of the acetic acid salt or the phosphoric acid salt is excessively great, on the other hand, formation of a uniform film tends to be difficult. Where two or more salts are blended in the resin composition, the total amount of the two or more salts preferably falls within the aforementioned range.

[Resin Composition Production Method]

The resin composition of the present disclosure is produced by using the EVOH (A), the polyamide resin (B), and the sorbic acid ester (C) as the essential components, and using any of the aforementioned additives as an optional component as required. Known examples of a method for the production include dry blending method, melt mixing method, solution mixing method, and impregnation method, which may be used in combination.

An example of the dry blending method is a method (I) including the step of dry-blending the sorbic acid ester (C) with pellets containing at least one selected from the group consisting of the EVOH (A) and the polyamide resin (B) by means of a tumbler or the like.

Examples of the melt mixing method include: a method (II) including the steps of melt-kneading a dry blend of the sorbic acid ester (C) and pellets containing at least one selected from the group consisting of the EVOH (A) and the polyamide resin (B), and forming the resulting melt mixture into pellets or other product; a method (III) including the steps of adding the sorbic acid ester (C) to at least one selected from the group consisting of the EVOH (A) and the polyamide resin (B) in a melted state, melt-kneading the resulting mixture, and forming the resulting melt mixture into pellets or other product; and a method including the steps of incorporating the sorbic acid ester (C) into at least one selected from the group consisting of the EVOH (A) and the polyamide resin (B), forming pellets of a sheath-core structure each including a core of the EVOH (A) and a sheath of the polyamide resin (B) or pellets of a sheath-core structure each including a sheath of the EVOH (A) and a core of the polyamide resin (B) by using the EVOH (A) and the polyamide resin (B), and melt-forming the pellets.

Examples of the solution mixing method include: a method (IV) including the steps of preparing a solution by using commercially available pellets containing at least one selected from the group consisting of the EVOH (A) and the polyamide resin (B), blending the sorbic acid ester (C) with the solution, solidifying and forming the resulting solution into pellets, separating the pellets from the solution, and drying the pellets; and a method (V) including the steps of adding at least one selected from the group consisting of the sorbic acid ester (C) and a solution of the polyamide resin (B) to a homogeneous solution (water/alcohol solution or the like) of the EVOH after the saponification in the preparation of the EVOH (A), solidifying and forming the resulting solution into pellets, separating the pellets from the solution, and drying the pellets.

An example of the impregnation method is a method (VI) including the steps of bringing pellets containing at least one selected from the group consisting of the EVOH (A) and the polyamide resin (B) into contact with an aqueous solution containing the sorbic acid ester (C) to incorporate the sorbic acid ester (C) into the pellets, and then drying the resulting pellets.

In the methods described above, a composition (master batch) containing the sorbic acid ester (C) at a higher concentration may be prepared by blending the sorbic acid ester (C) in a predetermined proportion with at least one selected from the group consisting of the EVOH (A) and the polyamide resin (B), and the resin composition may be produced as containing the sorbic acid ester (C) at a predetermined concentration by blending the master batch with the EVOH (A) or the polyamide resin (B).

In the present disclosure, different methods may be selected from the aforementioned methods to be used in combination. Particularly, the melt mixing method is preferred, and the method (II) is particularly preferred, because the resin composition produced by these methods is significantly improved in productivity and the effects of the present disclosure.

Where any of the aforementioned additives is blended as the optional component in the resin composition, the aforementioned production methods may be employed for blending the optional component in the resin composition.

Pellets of the resin composition to be produced by any of the aforementioned methods, and the pellets containing at least one selected from the group consisting of the EVOH (A) and the polyamide resin (B) to be used in any of the aforementioned methods may each have any desired shape. The pellets may each have, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and factually identified, and the minor diameter of the maximum sectional plane is measured in the aforementioned manner.

The resin composition of the present disclosure typically has a water content of 0.01 to 0.5 wt. %, preferably 0.05 to 0.35 wt. %, particularly preferably 0.1 to 0.3 wt. %.

In the present disclosure, the water content of the resin composition is measured and calculated by the following method.

The weight (W1) of a sample of the resin composition is measured at a room temperature (25° C.) by an electronic balance before drying, and the sample is dried at 150° C. for 5 hours in a hot air dryer. After the drying, the sample is cooled in a desiccator for 30 minutes. After the temperature of the sample of the resin composition is returned to the room temperature, the weight (W2) of the sample is measured. The water content of the resin composition is calculated from the following expression:

Water content($wt.$ %)=[($W1-W2$)/$W1$]×100

The resin composition of the present disclosure may be produced in any of various forms, e.g., in pellet form, powdery form, or liquid form, for use as a forming material for various formed products. Particularly, the resin composition of the present disclosure is preferably provided as a melt forming material, because the effects of the present disclosure tend to be more efficiently provided. The resin composition of the present disclosure may be a resin composition prepared by mixing the resin composition with a resin other than the EVOH (A) and the polyamide resin (B).

The pellets of the resin composition of the present disclosure may be used as they are for the melt forming. In order to ensure stable feeding of the resin composition pellets in the melt forming, it is also preferred to apply a known lubricant to surfaces of the pellets. Any of the lubricants described above may be used. The amount of the lubricant present on the pellets is typically not greater than 5 wt. %, preferably not greater than 1 wt. %, based on the weight of the resin composition.

Exemplary products to be formed from the resin composition of the present disclosure for practical applications include a single-layer film formed by using the resin composition of the present disclosure, and a multilayer structure including a layer formed by using the resin composition of the present disclosure.

[Multilayer Structure]

A multilayer structure of the present disclosure includes a layer formed from the resin composition of the present disclosure. The layer formed from the resin composition of the present disclosure (hereinafter referred to as "resin composition layer") may be laminated with some other base material (hereinafter referred to as "base resin") containing a thermoplastic resin other than the resin composition of the present disclosure as a major component. Thus, the resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred as hydrophobic resins.

Where resin composition layers a (a1, a2, ... ) and base resin layers b (b1, b2, ... ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layer is provided between the resin composition layer and the base resin layer in the multilayer structure, the adhesive resin layer is located in contact with the resin composition layer and, therefore, a highly hydrophobic adhesive resin is preferably used for the adhesive resin layer.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the weight of the base resin or the adhesive resin). These may be used alone or in combination.

The resin composition layer formed from the resin composition of the present disclosure and the base resin layer may be laminated together (optionally with the adhesive resin layer provided therebetween) by a known laminating method. Examples of the laminating method include: a method in which a film or a sheet of the resin composition of the present disclosure is laminated with the base resin by melt extrusion; a method in which the base resin layer is laminated with the resin composition of the present disclosure by melt extrusion; a method in which the resin composition and the base resin are coextruded; a method in which the resin composition layer and the base resin layer are dry-laminated together with the use of a known adhesive agent such as of organic titanium compound, isocyanate compound, polyester compound or polyurethane compound; and a method in which a solution of the resin composition is applied on the base resin layer, and a solvent is removed from the applied solution. Of these methods, the coextrusion method is preferred from the viewpoint of costs and environmental concerns.

The multilayer structure described above is further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the resin composition of the present disclosure is used as a shrinkable film, the stretched film may be cold-set so as to be imparted with a heat-shrinkable property, for example, by applying cold air over the stretched film without performing the above heat setting process.

Further, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the resin composition layer and the base resin layer of the multilayer structure (resin composition layer/base resin layer) (if these layers each include a plurality of layers, the thickness ratio between the thickest one of the resin composition layers and the thickest one of the base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like. Particularly, the layer formed from the resin composition of the present disclosure is less susceptible to the coloration and the melt viscosity increase. Therefore, the resin composition of the present disclosure and the multilayer structure including the layer formed from the resin composition of the present disclosure are particularly useful for hot-water sterilizable packaging materials for foods, chemical agents, agricultural chemicals, and the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

Prior to implementation of Examples, pellets of the following EVOH (A) and polyamide resins (B) were prepared.
EVOH (A): Ethylene-vinyl alcohol copolymer having an ethylene structural unit content of 29 mol %, a saponification degree of 100 mol %, and an MFR of 3.2 g/10 minutes (as measured at 210° C. with a load of 2160 g)
Polyamide resin (B-1): Nylon 6 (NOVAMID 1028EN available from DSM)
Polyamide resin (B-2): Nylon 6/66 (5033B available from Ube Industries, Ltd.)

Example 1

First, 80 parts of the pellets of the EVOH (A) and 20 parts of the pellets of the polyamide resin (B-1) were dry-blended. Then, 100 parts of the dry-blended pellets and 0.0000004 parts (corresponding to 0.004 ppm based on the weight of resin composition) of methyl sorbate (available from FUJIFILM Wako Pure Chemical Corporation, and having a molecular weight of 126) as the sorbic acid ester (C) were pre-heated at 250° C. for 5 minutes and then melt-kneaded at 250° C. for 5 minutes by operating a plastograph (available from Brabender Corporation) at 50 rpm. Then, the resulting melt mixture was cooled and solidified, whereby a resin composition was prepared in an aggregated form. The resin composition thus prepared was pulverized by operating a crusher (SKR16-240 available from Sometani Sangyo Co., Ltd.) with its rotary blade rotated at a rotation speed of 650 rpm. The pulverized product of the resin composition was in a granular form having a size of 1- to 5-mm square. The resin composition had a water content of 0.17%.

Example 2

A resin composition and a pulverized product of the resin composition of Example 2 were produced in substantially the same manner as in Example 1, except that the amount of methyl sorbate was 0.00008 parts (corresponding to 0.8 ppm based on the weight of the resin composition). The resin composition had a water content of 0.19%.

Example 3

A resin composition and a pulverized product of the resin composition of Example 3 were produced in substantially the same manner as in Example 1, except that ethyl sorbate (available from FUJIFILM Wako Pure Chemical Corporation, and having a molecular weight of 140) was used instead of methyl sorbate. The resin composition had a water content of 0.13%.

Example 4

A resin composition and a pulverized product of the resin composition of Example 4 were produced in substantially the same manner as in Example 1, except that the polyamide resin (B-2) was used instead of the polyamide resin (B-1). The resin composition had a water content of 0.15%.

Comparative Example 1

A resin composition and a pulverized product of the resin composition of Comparative Example 1 were produced in substantially the same manner as in Example 1, except that methyl sorbate was not blended. The resin composition had a water content of 0.17%.

Comparative Example 2

A resin composition and a pulverized product of the resin composition of Comparative Example 2 were produced in substantially the same manner as in Example 1, except that the amount of methyl sorbate was 0.0012 parts (corresponding to 12 ppm based on the weight of the resin composition). The resin composition had a water content of 0.11%.

Reference Example 1

A pulverized product of Reference Example 1 was produced by melt-kneading the EVOH (A) in substantially the same manner as in Example 1, except that the polyamide resin (B) and the sorbic acid ester (C) were not blended but the EVOH (A) was used alone. The EVOH (A) had a water content of 0.11%.

The resin compositions of Examples 1 to 4, Comparative Examples 1 and 2, and Reference Example 1 were each evaluated by the following methods. The results are shown below in Table 1.

[Coloration Evaluation]

The pulverized products of Examples 1 to 4, Comparative Examples 1 and 2, and Reference Example 1 were each used as a sample. The YI value of the sample was measured by means of a spectrophotometer SE6000 available from Nippon Denshoku Industries Co., Ltd. At this time, a cylinder having an inner diameter of 32 mm and a height of 30 mm was filled to level with the sample and, in this state, the measurement was performed. A higher YI value means that the resin composition was yellowed.

[Dynamic Viscosity Behavior]

By operating a plastograph (available from Brabender Corporation) at 50 rpm, 55 g of each of the pulverized products of Examples 1 to 4, Comparative Examples 1 and 2, and Reference Example 1 was melt-kneaded at 250° C. for 30 minutes. The resin compositions were each evaluated based on torque values measured after 15 minutes and 30 minutes. A higher torque value means that the resin composition has a higher viscosity.

TABLE 1

|  | Example 1 | Example 2 | Example 3 | Example 4 | Comparative Example 1 | Comparative Example 2 | Reference Example 1 |
|---|---|---|---|---|---|---|---|
| EVOH (A) (parts) | 80 | 80 | 80 | 80 | 80 | 80 | 100 |
| Polyamide resin (B) | | | | | | | |
| Type | Nylon 6 | Nylon 6 | Nylon 6 | Nylon 6/66 | Nylon 6 | Nylon 6 | — |
| (parts) | 20 | 20 | 20 | 20 | 20 | 20 | — |
| Sorbic acid ester (C) | | | | | | | |
| Type | Methyl sorbate | Methyl sorbate | Ethyl sorbate | Methyl sorbate | — | Methyl sorbate | — |
| Amount (ppm) | 0.004 | 0.8 | 0.004 | 0.004 | — | 12 | — |
| Coloration evaluation (YI value) | 47 | 42 | 42 | 42 | 53 | 49 | 32 |
| Dynamic viscosity behavior (Nm) | | | | | | | |
| 15 minutes | 21.19 | 22.86 | 20.88 | 20.49 | 23.26 | 22.93 | 7.61 |
| 30 minutes | 25.64 | 28.12 | 27.04 | 26.18 | 27.90 | 28.95 | 6.9 |

As shown in Table 1, the resin composition of Comparative Example 1 in which the EVOH (A) and the polyamide resin (B) were blended was colored with a higher YI value than the EVOH of Reference Example 1 not containing the polyamide resin (B). The resin composition of Comparative Example 2 in which the sorbic acid ester (C) was blended in an amount greater than the range specified by the present disclosure was slightly less susceptible to the coloration.

In contrast, the resin compositions of Examples 1 to 4 each containing a specific very small amount of the sorbic acid ester (C) were each less susceptible to the coloration with a lower YI value than the resin composition of Comparative Example 1. Further, the resin compositions of Examples 1 to 4 were each unexpectedly less susceptible to the coloration with a lower YI value than the resin composition of Comparative Example 2, although each containing the sorbic acid ester (C) in a smaller amount than in Comparative Example 2.

As for the dynamic viscosity behavior, the resin compositions of Comparative Examples 1 and 2 produced by using the EVOH (A) and the polyamide resin (B) suffered from the melt viscosity increase after 15 minutes and 30 minutes as compared with the EVOH of Reference Example 1 containing the EVOH (A) alone.

In contrast, the viscosities of the resin compositions of Examples 1 to 4 were lower than the viscosities of the resin compositions of Comparative Examples 1 and 2, and higher than the viscosity of the EVOH of Reference Example 1 after 15 minutes and 30 minutes. Thus, it is found that the melt viscosity increase was moderately suppressed.

Multilayer structures produced by using the resin compositions of Examples produced in the aforementioned manner, and hot-water sterilizable packaging materials formed from the multilayer structures are less susceptible to the coloration.

While specific forms of the embodiments of the present disclosure have been shown in the aforementioned examples, the examples are merely illustrative but not limitative. It is contemplated that various modifications apparent to those skilled in the art could be made within the scope of the disclosure.

The resin composition of the present disclosure is less susceptible to the coloration and the melt viscosity increase. Therefore, the resin composition of the present disclosure, and the multilayer structure including the layer formed from the resin composition of the present disclosure are useful as packaging materials for various foods, condiments such as mayonnaise and dressing, fermented foods such as miso, fat and oil such as salad oil, beverages, cosmetics, and pharmaceutical products, and particularly useful for hot-water sterilizable packaging materials.

The invention claimed is:

1. A resin composition comprising:
   (A) an ethylene-vinyl alcohol copolymer;
   (B) a polyamide resin; and
   (C) at least one sorbic acid ester selected from the group consisting of methyl sorbate and ethyl sorbate;
   wherein the at least one sorbic acid ester (C) is present in an amount of 0.00001 to 10 ppm based on a weight of the resin composition.

2. The resin composition according to claim 1, wherein the ethylene-vinyl alcohol copolymer (A) and the polyamide resin (B) are present in a weight ratio (A)/(B) of 1/99 to 99/1.

3. A melt-forming material comprising the resin composition according to claim 1.

4. A multilayer structure comprising a layer that comprises the resin composition according to claim 1.

5. A hot-water sterilizable packaging material comprising the multilayer structure according to claim 4.

* * * * *